May 7, 1963 R. B. MATTHEWS 3,089,014
NIGHT SETBACK THERMOSTAT
Filed Sept. 15, 1960

INVENTOR.
Russell B. Matthews
BY
Joseph G. Schwalbach
ATTORNEY

United States Patent Office 3,089,014
Patented May 7, 1963

3,089,014
NIGHT SETBACK THERMOSTAT
Russell B. Matthews, Wauwatosa, Wis., assignor, by mesne assignments, to Penn Controls, Inc., Goshen, Ind., a corporation of Indiana
Filed Sept. 15, 1960, Ser. No. 56,305
8 Claims. (Cl. 200—140)

This invention relates to improvements in condition responsive circuit controlling devices and more particularly to improvements in thermostats.

In the control of heating systems it has long been common to cycle the heat source off and on by means of a room thermostat having a manually operable multiple setting control point adjustment means. In the interest of conservation of fuel it is also a common practice to adjust the temperature control point setting of such a thermostat downwardly in the evening and to readjust the setting upwardly to its original position in the morning. This practice is termed "night turndown" or "night setback." Adjustment of the control point of a thermostat as aforedescribed requires not only visual acuity and sufficient illumination to read indicator of the thermostat, but it also must be done deliberately and with care.

It is a general object of the present invention to provide an improved thermostat having a two position night set back control point adjustment member, movement of which from an "off" position to an "on" position effects predetermined depression of the temperature control point of said thermostat.

Another object of the invention is to provide an improved thermostat of the aforementioned character having a multiple setting manually operable control point adjustment means the setting of which is unaffected by actuation of said night setback control point adjustment member to one or the other of its controlling positions.

Another object of the invention is to provide an improved thermostat as aforedescribed which in one form thereof the night setback control point adjustment member is manually actuatable, and in another form thereof actuation of said member is effected at preselected intervals by a timer controlled mechanism.

A more specific object of the invention is to provide an improved thermostat of the class described in which a pair of cooperating low resistance contacts are within and fixed respectively to the relatively movable opposite end walls of a temperature responsive expansible and contractible hermetically sealed enclosure, the multiple setting control point adjustment means being operatively associated with one of said end walls and contacts, and the night setback control point adjustment member being operatively associated with the other end wall and contact.

Figure 1:
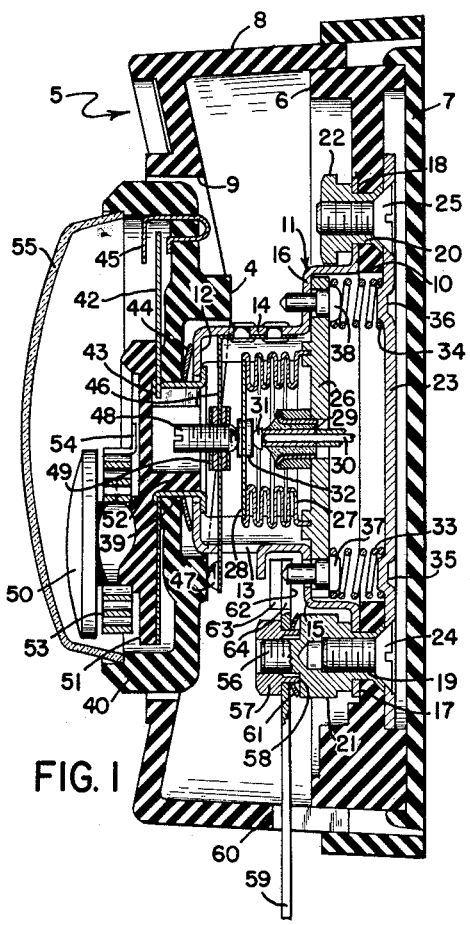
Figure 2:
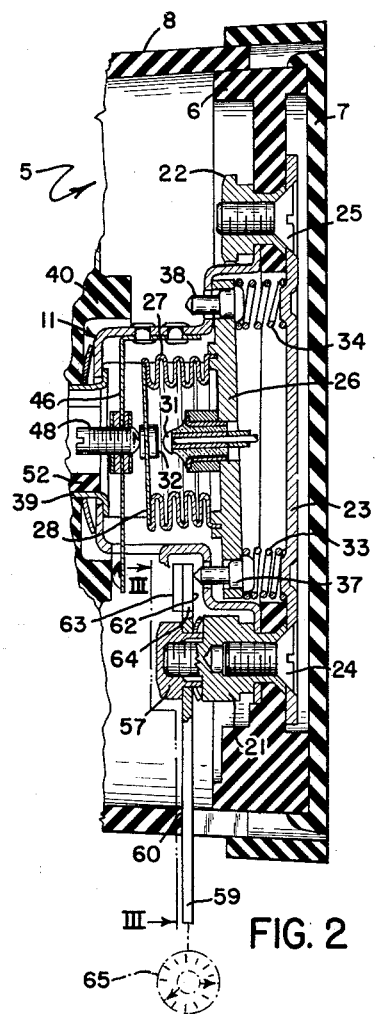
Figure 3:
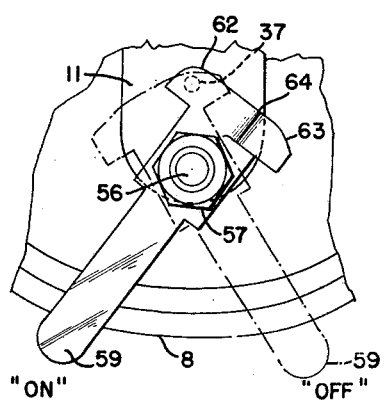

Other and further objects and advantages of the invention will become apparent as the description proceeds, reference being had to the accompanying drawings in which:

FIGURE 1 is a vertical sectional view of one form of improved thermostat constructed in accordance with the inventive concept, the night setback control point adjustment member being disposed in "off" position;

FIGURE 2 is a fragmentary vertical sectional view similar to FIGURE 1 showing the night setback control point adjustment member in "on" position and the parts actuated thereby in correspondingly adjusted position, a timer controlled actuating mechanism for said night setback control point adjustment member being shown schematically in broken lines; and FIGURE 3 is a fragmentary sectional plan view taken along the line III—III of FIGURE 2 and showing in solid lines the "on" position and in broken lines the "off" position of the night setback control point adjustment member.

The form of the invention selected for illustration in the drawings comprises a condition responsive circuit controlling device in the form of a thermostat indicated generally by the numeral 5. The thermostat assembly 5 comprises a base 6 of electrically insulating material, for example plastic, which may be suitably fixed to a wall bracket 7 adapted to be mounted on a wall or other suitable surface. Removably fixed to the base member 6 is a cover or housing 8 formed with a central opening 9. The base member 6 has a central opening 10, and fixed to a upper side of said base straddling the opening 10 is a mounting member 11 in the form of a metal stamping having a centrally apertured end wall portion 12 and a pair of spaced leg portions 13 and 14 formed with outwardly offset shoulder portions 15 and 16 respectively and terminating in oppositely outwardly directed flange portions 17 and 18 respectively overlaying the base member 6. The base member 6 and the flanges 17 and 18 are formed with registering apertures for snugly receiving tubular extensions 19 and 20 formed on nuts 21 and 22. Overlaying the underside of the base 6 in straddling relation with the opening 10 and in alinement with the mounting member 11 is a retainer plate 23 formed with tapered apertures for receiving screws 24 and 25 which are threaded into the nuts 21 and 22 respectively to secure the mounting member 11 and plate 23 to the base 6.

An expansible and contractible temperature responsive hermetically sealed enclosure comprising a metallic base plate 26 having projecting end portions which engage the under surfaces of the shoulder portions 15 and 16 of mounting member 11 as shown. Sealed to the base plate 26 is a generally cup-shaped bellows having a thin flexible annular corrugated side wall 27 and an end wall 28 parallel with the base plate 26. The base plate 26 is apertured to receive a glass seal 29 which carries a first contact 30 having a head portion 31 within the enclosure positioned for cooperation with a second contact 32 carried by and electrically joined to the bellows end wall 28. The contacts 31 and 32 are preferably of the low resistance type, being made, for example, of silver. The enclosure described preferably contains a temperature responsive volatile fluid fill which does not react to form resistance increasing films on the contacts or to otherwise tend to increase the contact resistance.

Means is provided for biasing the base plate 26 and contact 30 toward their positions of FIGURE 1, said means comprising a pair of helical compression springs 33 and 34 interposed between the retainer plate 23 and the end portions of the base plate 26 as shown. The retainer plate 23 is preferably formed with upset portions 35 and 36 projecting into and positioning the ends of the springs 33 and 34 engaging the retainer plate 23. The opposite ends of said springs are retained in position by the heads of pins 37 and 38 disposed therewithin, said pins having a press fit fixing the same within suitable apertures in the projecting end portions of the base plate 26. The upper ends of the pins 37 and 38 slidably project through suitable apertures in the shoulder portions 15 and 16 of the mounting member 11 as shown.

Affixed, as by brazing, coaxially within the aperture formed in the end wall 12 of the mounting member 11 is a tubular bearing sleeve 39, and rotatably mounted on said sleeve is a manually adjustable temperature control point adjustment member 40 positioned coaxially within the opening 9 of the housing 8 as shown. The member 40 is generally cup-shaped and the underside thereof is formed with a circular cam surface 41 as shown. Overlaying the bottom inner surface of the member 40 is an indicia bearing plate 42 which is centrally apertured to receive the sleeve 39 and is fixed against rotation with respect thereto by a tongue or tab 43 projecting through a suitable slot formed in the upper end of said sleeve. The outer end of the sleeve 39 is rolled over to prevent a removal of the indicia plate 42 and member 40, and interposed between the underside of the member 40 and the end wall 12 of the mounting member 11 is a spring washer 44. The adjustment member 40 has molded therein a pointer member 45 cooperable with the indicia on the plate 42 to indicate the control point temperature of a given setting of the member 40.

A generally L-shaped resilient blade 46 has one end fixed to the leg 14 of member 11, as by rivets, said blade extending diametrically across and adjacent the bellows end wall 28 and through an opening in leg 13 of member 11, terminating in a bead portion 47 having sliding engagement with the cam surface 41 on the member 40. The blade 46 carries a factory adjustment screw 48 which engages the bellows end wall 28 as shown and extends coaxially of the sleeve 39, said blade being apertured and provided with suitable elastic nut means 49 for receiving screw 48 and retaining the latter in adjusted position. The coaction of the blade 46 with the cam surface 41, acting through the screw 48 compressably biases the bellows end wall 28 against the inherent resilience of the corrugated bellows wall 27 and the expansive force of the volatile fluid fill within the enclosure. It is apparent that the member 40 and the associated parts provide a multiple setting control point adjustment means for the contacts 30 and 32. Rotation of the member 40 in one direction or the other has the effect of increasing or decreasing the bias exerted on the wall 28 by screw 48. Irrespective of the setting of the member 40, the expansive force exerted by and within the enclosure is never sufficient to move the base plate 26 against the bias of the springs 33 and 34 out of engagement with the shoulder portions 15 or 16 of the member 11, any thermal expansion of the enclosure having the effect only of deforming the resilient blade 46.

The thermostat 5 may include a thermometer assembly 50 comprising a base 51 formed with a slotted tubular extension 52 removably telescoped into the sleeve member 39 as shown. The thermometer 50 may comprise a spiral bimetallic temperature responsive member 53 carrying a pointer member 54 cooperable with suitable indicia on the base 51. The cup-shaped adjustment member 40 and the parts disposed therein are enclosed by a generally cup-shaped transparent cover or crystal 55, for example of plastic, removably telescoped therein.

The thermostat 5 is provided with a two position "night setback" temperature control point adjustment means operable independently of the multiple setting control point adjustment member 40. To this end, the nut 21 is formed with a stud portion 56 on which is threaded a nut 57 formed with a sleeve portion 58 of reduced outside diameter and enlarged inside diameter. A night setback control point adjustment member in the form of a lever 59 has a terminal portion projecting externally of the housing 8 through a suitable opening 60 in said housing and is apertured intermediate its length to receive the sleeve portion 58 of the nut 57 as shown. A spring washer 61 is interposed between the main body portion of the nut 21 and the lever 59 and surrounds the sleeve portion 58 of the nut 57. The lever 59 is generally T-shaped, and the inner end thereof is formed with cam portions 62 and 63, the under surfaces thereof being disposed in offset parallel planes connected by an intermediate angled portion 64.

In FIGURE 1 and in the dot and dash line position of FIGURE 3 the member 59 is in "off" position wherein the upper end of the pin 37 engages the underside of the cam surface portion 63. By movement of the lever 59 to the position thereof shown in FIGURE 2 and in solid lines in FIGURE 3, the cam portion 62 is brought into engagement with the pin 37, causing depression of said pin and corresponding downward tilting movement of the base plate 26 therewith as shown in FIGURE 2. This moves the base plate 26 away from the bellows end wall 28 which remains substantially sationary, except for slight tilting, during such movement of the base plate 26, and as shown in FIGURE 2, such movement of the base plate 26 has the effect of moving the head 31 of contact 30 out of engagement with the contact 32 or at least to circuit-interrupting position with respect thereto. This has the effect of substantially reducing the temperature control point of the contacts 30 and 32, for example by fifteen or twenty degrees. Thus, as an example, if the member 40 were set at a setting of 72°, movement of the lever 59 to "on" position reduces the control point temperature at which the contacts 30 and 32 will make to approximately 55°. Returning the lever 59 to its initial "off" position shown in FIGURE 1 returns the parts to their positions shown in FIGURE 1, so that the setting of the member 40 is again controlling, i.e., for example the control point is returned to 72°. It will be apparent that movement of the night setback lever 59 to or from on and off positions can be affected quickly without the necessity of carefully observing the vernier dial settings of the member 40 and without careful close adjustment of the member 59. It will also be observed that the night setback control point adjustment is effected without in anywise disturbing the adjustment of the multiple setting control point adjustment member 40.

The improved thermostat 5 is particularly well adapted for use in low voltage electrical circuits including thermo-electrically powered circuits. Electrical connection for the thermostat is made by suitable connections (not shown) to the contact 30 and to the metallic base plate 26.

The invention contemplates the use of timer controlled means for actuating the night setback lever 59 at preselected intervals, such a timer controlled actuating mechanism being shown schematically associated with the lever 59 at 65 in FIGURE 2. Various other changes and modifications may be made without departing from the spirit of the invention, and all of such changes are contemplated as may come within the scope of the appended claims.

What is claimed as the invention is:

1. A condition responsive circuit controlling device comprising a first contact having means biasing it toward a first position and movable against the bias of said biasing means to a second position, a second contact cooperable with said first contact, condition responsive actuating means for moving said second contact between circuit-making and circuit-interrupting positions with respect to said first contact in response to changes in a given condition when said first contact is in its said first position, and means for selectively moving said first contact against the bias of said biasing means and in a direction away from said second contact toward its said second position.

2. A condition responsive circuit controlling device comprising a first contact having means biasing it toward a first position and movable against the bias of said biasing means to a second position, a second contact cooperable with said first contact, condition responsive actuating means for moving said second contact between circuit-making and circuit-interrupting positions with respect to said first contact in response to changes in a given condition when said first contact is in its said first position, manually operable first control point adjustment means operatively associated with said second contact, and second control point adjustment means for moving said first contact against the bias of said biasing means and in a direction away from said second contact toward its said second position to thereby substantially change the control point of said device without changing the setting of said first control point adjustment means.

3. A condition responsive circuit controlling device comprising a first contact having means biasing it toward a first position and movable against the bias of said biasing means to a second position, a second contact cooperable with said first contact, condition responsive actuating means for moving said second contact between circuit-making and circuit-interrupting positions with respect to said first contact in response to changes in a given condition when said first contact is in its said first position, manually operable first control point adjustment means operatively associated with said second contact, and manually operable second control point adjustment means for selectively moving said first contact against the bias of said biasing means and in a direction away from said second contact toward its said second position to thereby substantially change the control point of said device without changing the setting of said first control point adjustment means.

4. A condition responsive circuit controlling device comprising a first contact having means biasing it toward a first position and movable against the bias of said biasing means to a second position, a second contact cooperable with said first contact, condition responsive actuating means for moving said second contact between circuit-making and circuit-interrupting positions with respect to said first contact in response to changes in a given condition when said first contact is in its said first position, manually operable first control point adjustment means operatively associated with said second contact, and timer controlled means for moving said first contact against the bias of said biasing means and in a direction away from said second contact toward its said second position to thereby substantially change the control point of said device at a preset time without changing the setting of said first control point adjustment means.

5. A thermostat comprising a temperature responsive expansible and contractible enclosure having relatively movable end walls, a pair of cooperating contacts within said enclosure and fixed respectively to said end walls, means biasing said one end wall toward the other end wall and into engagement with abutment means defining a first position of said one end wall and of the contact fixed thereto, manually adjustable multiple setting control point adjustment means comprising a resiliently mounted abutment member engaging the other end wall of said enclosure, and setback means comprising means operatively associated with said one end wall for moving the same and its associated contact against the bias of said biasing means toward a second position effecting a predetermined reduction in the control point temperature without changing the setting of said multiple setting control point adjustment means.

6. A thermostat comprising a temperature responsive expansible and contractible enclosure having relatively movable end walls, a pair of cooperating contacts within said enclosure and fixed respectively to said end walls, means biasing said one end wall toward the other end wall and into engagement with abutment means defining a first position of said one end wall and of the contact fixed thereto, manually adjustable multiple setting control point adjustment means comprising a resiliently mounted abutment member engaging the other end wall of said enclosure, and setback means comprising cam means operatively associated with said one end wall and movable from an inoperative position to a setback position to thereby move said one end wall and its associated contact against the bias of said biasing means toward a second position effecting a predetermined reduction in the control point temperature without changing the setting of said multiple setting control point adjustment means.

7. A thermostat comprising a temperature responsive expansible and contractible enclosure having relatively movable end walls, a pair of cooperating contacts within said enclosure and fixed respectively to said end walls, means biasing said one end wall toward the other end wall and into engagement with abutment means defining a first position of said one end wall and of the contact fixed thereto, manually adjustable multiple setting control point adjustment means comprising a resiliently mounted abutment member engaging the other end wall of said enclosure, and setback means comprising a manually operated cam lever operatively associated with said one end wall and movable from an inoperative position to a setback position to thereby move said one end wall and its associated contact against the bias of said biasing means toward a second position effecting a predetermined reduction in the control point temperature without changing the setting of said multiple setting control point adjustment means.

8. A thermostat comprising a temperature responsive expansible and contractible enclosure having relatively movable end walls, a pair of cooperating contacts within said enclosure and fixed respectively to said end walls, means biasing said one end wall toward the other end wall and into engagement with abutment means defining a first position of said one end wall and of the contact fixed thereto, manually adjustable multiple setting control point adjustment means comprising a resiliently mounted abutment member engaging the other end wall of said enclosure, and setback means comprising a cam operatively associated with said one end wall and movable from an inoperative position to a setback position to thereby move said one end wall and its associated contact against the bias of said biasing means toward a second position effecting a predetermined reduction in the control point temperature without changing the setting of said multiple setting control point adjustment means, and timer controlled actuating mechanism for said cam.

References Cited in the file of this patent

UNITED STATES PATENTS

| Re. 17,453 | Klahn et al. | Oct. 8, 1929 |
| 1,749,392 | Penn | Mar. 4, 1930 |
| 1,900,985 | Giesler | Mar. 14, 1933 |
| 2,724,030 | Hilgert | Nov. 15, 1955 |